United States Patent [19]

Takeda

[11] Patent Number: 4,883,377
[45] Date of Patent: Nov. 28, 1989

[54] CHARACTER PATTERN GENERATOR FOR DOT MATRIX PRINTER

[75] Inventor: Hiroshi Takeda, Nagano, Japan

[73] Assignee: Seiko Epson Corporation, Tokyo, Japan

[21] Appl. No.: 183,323

[22] Filed: Apr. 6, 1988

Related U.S. Application Data

[63] Continuation of Ser. No. 852,860, Apr. 16, 1986, abandoned.

[30] Foreign Application Priority Data

Apr. 18, 1985 [JP] Japan .................................. 60-82951

[51] Int. Cl.$^4$ ........................ B41J 3/12; B41J 19/32
[52] U.S. Cl. .................................. 400/121; 400/303; 400/306
[58] Field of Search ............... 400/121, 124, 303, 306; 101/93.04, 93.05

[56] References Cited

U.S. PATENT DOCUMENTS

| | | | |
|---|---|---|---|
| 3,964,591 | 6/1976 | Hill | 400/126 |
| 4,371,274 | 2/1984 | Jaeger | 400/121 |
| 4,458,333 | 7/1984 | Smith | 400/121 X |
| 4,468,141 | 8/1984 | Rosza | 400/121 X |
| 4,469,455 | 9/1984 | Makita | 400/144.2 X |

FOREIGN PATENT DOCUMENTS 103765 6/1984 Japan .................................. 400/303

OTHER PUBLICATIONS

*IBM Tech. Disc. Bulletin*, by T. Nohzawa, vol. 22, No. 8B, Jan. 1980, pp. 3742-3743.

Primary Examiner—Paul T. Sewell
Attorney, Agent, or Firm—Blum Kaplan

[57] ABSTRACT

A character pattern generator for a dot-matrix type printer. A storage device stores first dot pattern data for fixed pitch printing and second dot pattern data for proportional printing where the proportional printing dot pattern data corresponding to a character differs from the corresponding characters fixed pitch print data. A first address location pointer indicates the addresses of the fixed pitch dot pattern data in the storage device. A second address location pointer indicates the addresses of the proportional printing data in the storage device. A selector coupled to the storage device and the first and second address location pointers receives a character code signal and an attribute signal indicative of one of the fixed pitch and proportional pitch printing modes and supplies the character code signal to either the first or the second address location pointer in accordance with the attribute signal.

20 Claims, 5 Drawing Sheets

The combat was over. There was poor Narseddin whose clothes were worn to tatters and whose beard was cut off. He hung down his head much discouraged and said helplessly,"Give up."

FIG. 4

The combat was over. There was poor Narseddin whose clothes were worn to tatters and whose beard was cut off. He hung down his head much discouraged and said helplessly,"Give up."

FIG. 5

CHARACTER PATTERN GENERATOR FOR DOT MATRIX PRINTER

This is a Continuation of Application Ser. No. 852,860, filed on Apr. 16, 1986, now abandoned.

BACKGROUND OF THE INVENTION

The invention is generally directed to a character pattern generator for European including English-language alphabet character sets adapted for use in a dot matrix printer and in particular in a dot matrix type printer capable of fixed pitch and proportional pitch printing. Dot matrix type printers, such as wire type dot printers, ink jet type printers and heat transfer type printers, form characters and/or figures by printing a series of dots while moving the print head transversely across the paper. The head includes a plurality of dot generating mechanisms arranged to extend substantially parallel to the paper feeding direction. Character codes transmitted from another device such as a computer, are converted into dot patterns prior to driving the print head to produce the desired dots.

Printers adapted to print European language alphabet characters are frequently configured to print both fixed pitch and proportional pitch characters, often in the same document. Fixed pitch printing is accomplished by specifying a fixed character matrix, for example a 7×9 character matrix, with each character being assigned an entire matrix. In proportional pitch printing, in contrast, narrow characters are assigned smaller matrices while wider letters are assigned wider character matrices to provide a more natural and "printed" appearance to the finished results.

The need for a single printer to be able to print with both fixed pitch and proportional pitch spacing has required two complete sets of dot pattern data to be stored in the character generator. The first dot pattern data set is for fixed pitch printing and the second is for proportional pitch printing. As a result, both sets must be stored in a memory device which is thus required to have a large capacity which results in increased cost for the character pattern generator and the printer as well.

There is, therefore, need for a character pattern generator for a dot matrix printer which reduces the number of different character dot pattern data required for fixed pitch and proportional pitch printing of European including English language alphabet characters.

SUMMARY OF THE INVENTION

The invention is generally directed to a character pattern generator for a dot matrix type printer. A dot pattern data storage element stores first dot pattern data for fixed pitch printing and second dot pattern data for proportional printing where the proportional printing print data corresponding to a character code differs from the fixed pitch print data. A first address location pointer indicates the addresses of the fixed pitch dot pattern data in the dot pattern data storage element. A second address location pointer indicates the addresses of the proportional printing print data including usable first dot pattern data and second dot pattern data stored in the dot pattern data storage element. A selection device coupled to the dot pattern data storage element and the first and second address location pointers receives a character code signal and an attribute signal indicative of one of a fixed pitch and proportional pitch printing and supplies the character code signal to either the first or second address location pointer in accordance with the attribute signal.

Accordingly, it is an object of the instant invention to provide an improved character pattern generator for a dot matrix printer.

Another object of the invention is to provide an improved character pattern generator for a dot matrix printer which reduces the storage requirements for a character pattern generator capable of fixed pitch and proportional pitch printing.

A further object of the invention is to provide a character pattern generator for a dot matrix printer which reduces the need for storage capacity in the character pattern generator by storing separate dot pattern data for proportional pitch character only where they differ from the corresponding fixed pitch dot pattern data.

Yet another object of the invention is to provide a character pattern generator which causes the printer to print the fixed pitch character pattern data for a character code to be printed in proportional pitch where the proportional and fixed pitch dot pattern data does no differ.

Still another object of the invention is to provide a character pattern generator for a dot matrix type printer which reduces the number of different character associated dot pattern data which must be stored in the character generator for printing in both a fixed pitch and proportional pitch style.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is a diagram showing an example of fixed pitch printing in accordance with the invention;

FIG. 5 is a diagram showing an example of proportional pitch printing in accordance with the invention;

DETAILED DESCRIPTION OF THE PREFERRED EMBODIMENTS

Figure 1:
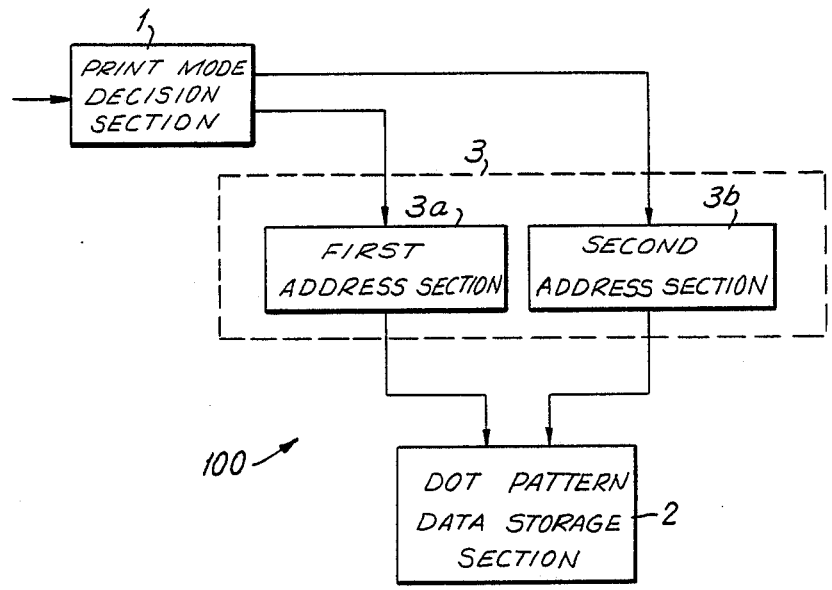
FIG. 1 is a functional block diagram of a character generator constructed in accordance with a preferred embodiment of the invention.

Reference is first made to FIG. 1 wherein a character generator constructed in accordance with a preferred embodiment of the invention is depicted. A print mode decision section 1 is coupled to an outside device (not shown) such as a computer, host machine or other device and receives a character code signal and an attribute signal from the outside device. The attribute signal indicates whether the character, corresponding to the character code signal, should be printed in a fixed pitch or proportional pitch printing style.

Print mode decision section 1 is coupled to an address section 3 composed of a first address section 3a and a second address section 3b. First address section 3a contains the addresses of dot pattern data for fixed pitch printing characters stored in a dot pattern data storage section 2. Second address section 3b contains the addresses of the stored dot pattern data for proportional pitch printing characters stored in dot pattern data storage section 2.

Dot pattern data storage section 2 is configured to store dot pattern data for each of the characters in fixed pitch printing style of the at least one particular font type. In addition, dot pattern storage section 2 stores dot pattern data for each character in the corresponding proportional pitch printing style of the particular font type which is different from the character in the fixed pitch printing style. In other words, the proportional pitch character dot pattern data for each font type stored in section 2 is limited to only those characters which have different dot pattern data for the proportional pitch and fixed pitch printing styles. Thus, where the dot pattern data associated with a character in both its fixed pitch and proportional pitch printing styles is the same, the dot pattern data is only stored once. The dot pattern data for the fixed pitch and proportional pitch printing styles are often the same. Thus, a considerable saving in memory capacity required of dot pattern data storage section 2 is effected.

The character code signal provided from an outside device (not shown) is applied through a buffer memory (not shown) to print mode decision section 1. Print mode decision section 1 decides, on the basis of the attribute signal coupled to the character code signal, between the fixed pitch printing and the proportional printing. Then, print mode decision section 1 transmits the character code signal to either first address section 3a or second address section 3b, depending upon whether the attribute signal calls for fixed pitch or proportional pitch printing, respectively.

(I) Fixed Pitch Printing

When print mode decision section 1 determines on the basis of the attribute signal that the input character code signal is of the fixed pitch printing type, print mode decision section 1 transmits the character code signal to first address section 3a, which in turn selects or points to the address in dot pattern storage section 2 at which the associated fixed pitch printing dot pattern data is stored. As a result, the character code signal is converted into the associated fixed pitch printing dot pattern data. This dot pattern data for fixed pitch printing is stored in a line buffer memory (not shown) and then applied to a print head (not shown) for printing.

(II) Proportional Printing

Reference is next made to FIGS. 4–7 wherein the differences between fixed pitch and proportional pitch printing are shown. In fixed pitch printing the width of a character including the blank portions on either side of the dots forming the character are identical for each character (FIG. 4). However, in proportional pitch printing the character width including the blank portions btween characters and the gap between characters are made variable, depending upon the actual width of the character so that the printed characters are easier to read.

Figure 6:
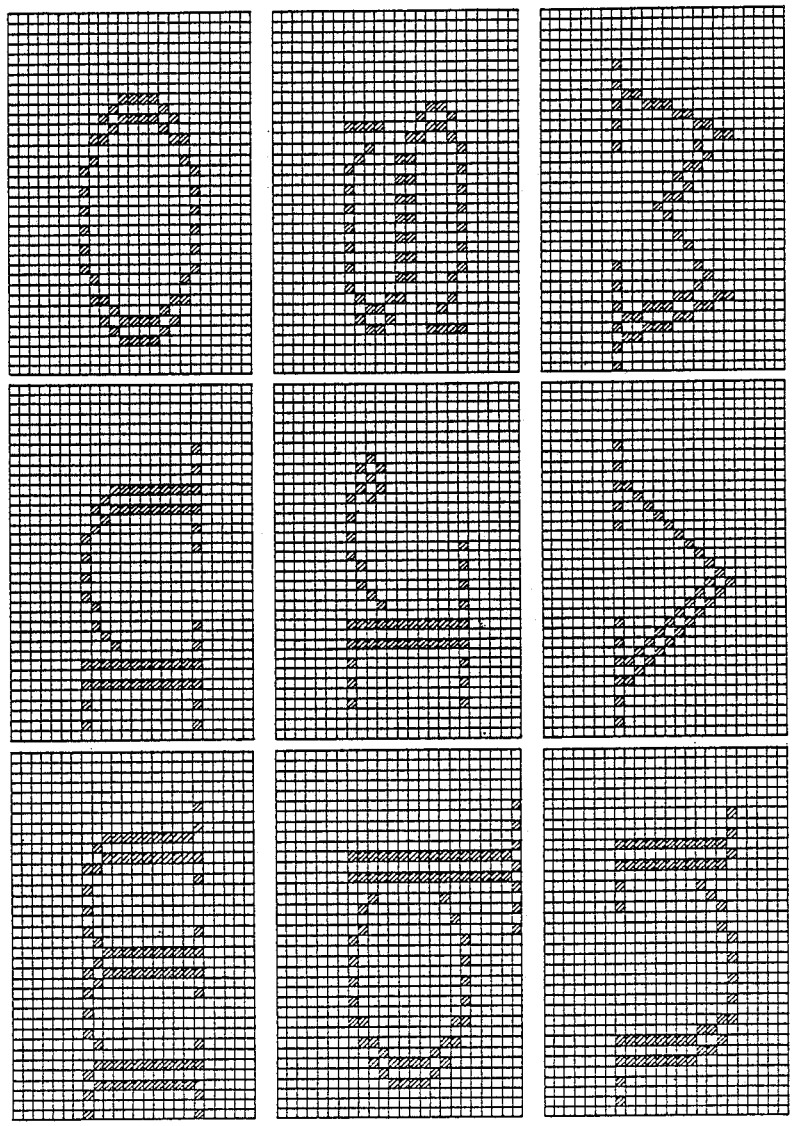
FIG. 6 is a dot pattern map showing the dot pattern data for several fixed pitch characters.
Figure 7:
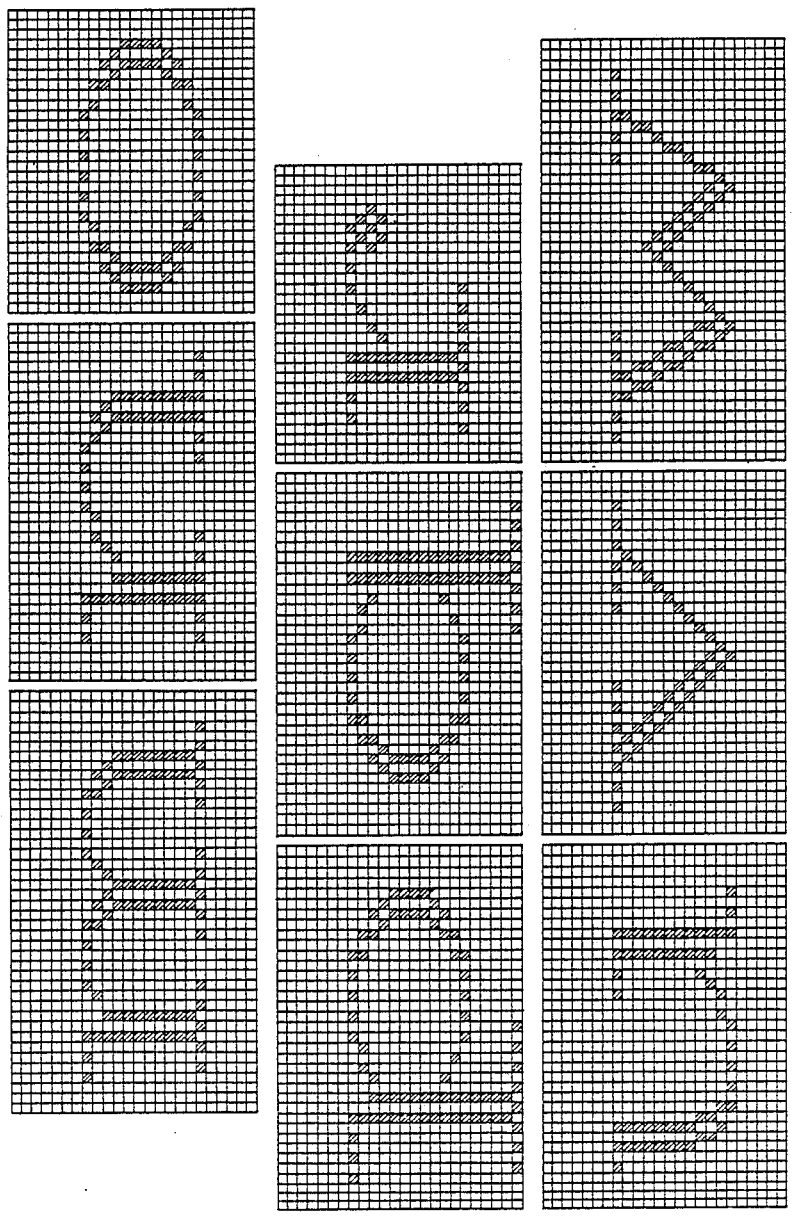
FIG. 7 is a dot pattern map showing the dot pattern data fo several proportional printing characters in accordance with the invention.

FIG. 6 illustrates the fixed pitch form of character in greater detail where each character matrix is identical in size, although different characters occupy different portions of the character matrix. FIG. 7 illustrates a series of proportional pitch character matrices for various characters where the differences in width of the characters is illustrated. As is apparent from the comparison between FIGS. 6 and 7 and between the various characters in FIG. 7, there is a significant difference between the proportional characters. Some characters, both without and with the blank spaces on the left and right of character are the same size in both the proportional pitch and fixed pitch modes, such as the "q" or "o". There are also characters such as the "w" which are substantially wider in the proportional printing mode than in the fixed pitch mode. Finally, there are other characters such as the "r" which are narrower than the corresponding letter in the fixed pitch mode. The character pattern generator constructed in accordance with the present invention uses the fixed pitch pattern for a character in both modes of printing where the print data matrix of the character in the proportional mode is the same as in the fixed pitch mode.

Figure 2:
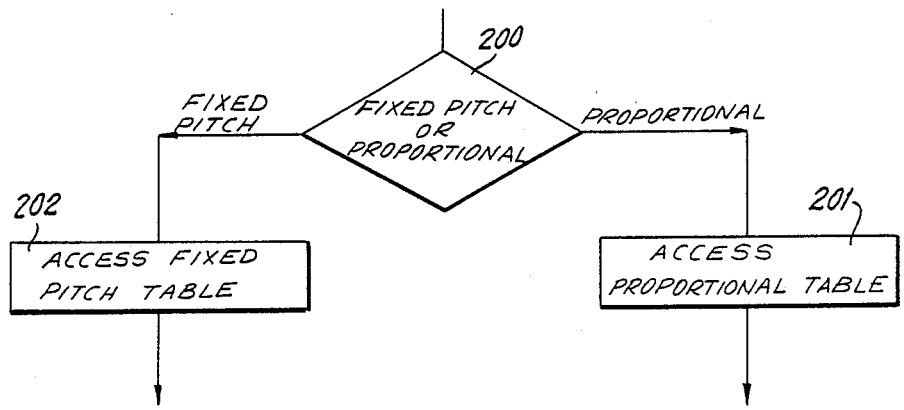
FIG. 2 is a functional flow chart diagram showing the operation of the character generator constructed in accordance with the invention.

Reference is next made to FIG. 2 for a description of the operation of the printer in greater detail. In step 200 a decision, based on the attribute signals, is made whether the character corresponding to the associated character code should be printed out in the fixed pitch or proportional pitch modes. The decision is made by, for example, checking the status of print mode flag (for example, the flag may assume that "1" indicates proportional mode and "0" indicates a fixed pitch mode), which is stored in the storage region in print mode decision section 1 (FIG. 1). If print mode decisions section 1 decides in step 200 that proportional mode printing is indicated, control shifts to step 201 where the proportional mode table is accessed. If in step 200 it is determined that the fixed pitch mode is selected, then control shifts to step 202 where the fixed pitch table is accessed.

Figure 3:
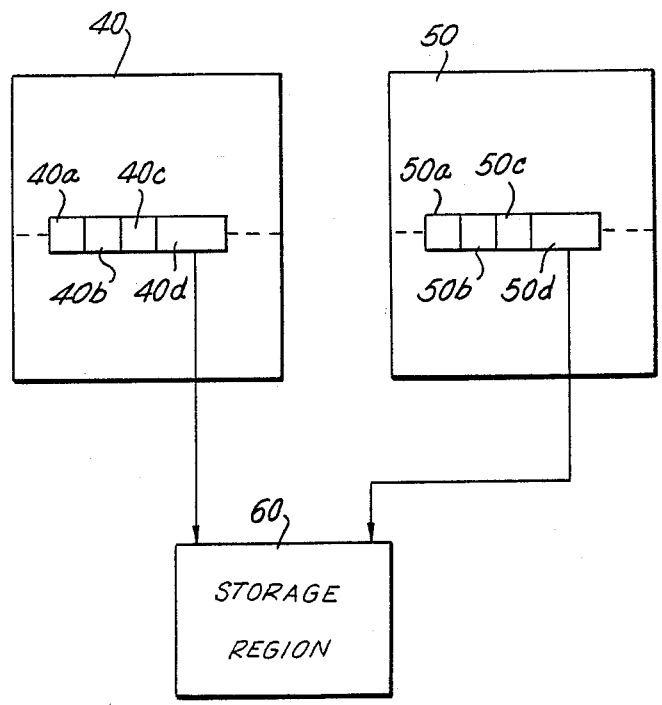
FIG. 3 is a functional block diagram showing the manner of operation of the character generator when the dot pattern data is accessed on receipt of a character code signal.

Reference is next made to FIG. 3 wherein the operation of the character generator as described in FIG. 2 is shown. A fixed pitch mode table 40 and a proportional pitch mode table 50 are coupled to a storage region 60. Fixed pitch table 40, proportional pitch table 50 and storage region 60 correspond, respectively to first address section 3a, second address section 3b and dot pattern data storage section 2 in FIG. 1.

Fixed pitch table 40 contains a series of pointers which point to the addresses of the fixed pitch dot pattern data in storage region 60 for fixed pitch mode printing. Reference numerals 40a, 40b, 40c and 40d indicate a set of data fields corresponding to each character/symbol code. The size of the blank portion on the left-hand side of the character/symbol is indicated as reference numeral 40a, the width of the character/symbol pattern itself is indicated as reference numeral 40b, the size of the blank portion on the right-hand side of the character/symbol is reference numeral 40c and the starting address of the dot pattern data corresponding to the character/symbol code in question within storage region 60 is identified as reference numeral 40d. Dot pattern data as used herein refers to the data stored in storage region 60 beginning at the starting address 40d and continuing for width 40b excluding the blank portions on the left and right 40a, 40c.

Where an 8-bit microprocessor with 16 address lines is utilized to operate the character generator, starting address 40d requires two bytes. If each of data fields 40a, 40b and 40c are represented by one byte, a 5 byte region is required for each record associated with a single character code.

Reference numerals 50a–50d correspond to reference numerals 40a–40d, but are the data field representative of the proportional pitch print mode information for the character/symbol codes. For those characters where the fixed pitch character pattern and proportional pitch patterns may be jointly used, addresses 40d and 50d are set the same. The space or gap between characters is changed by means of adjusting fields 40a and 40c or 50a and 50c to provide either fixed pitch mode printing or proportional mode printing. Fields 40b and 50b, which designate the width of the pattern itself, are used in connection with starting address fields 40d and 50d to identify the starting and ending locations in storage region 60 of the specified stored dot pattern data.

When entries either in fixed pitch table 40 or proportional pitch table 50 are accessed, it is done by the use of the character/symbol code. However, because the location to be accessed by the use of the code depends also upon the print mode (attribute signal) a print mode flag is utilized. For example, the starting address of table 40 is differentiated from that of table 50 by the print mode flag. One way of doing this is to start the address of each record in table 40 with "0" and the address of each record in table 50 with a "1". Thus the fixed pitch print table would begin at 0000H and the proportional pitch print table would begin at 8000H (1000 0000 0000 0000). Then, the address is calculated by the use of the character/symbol code and the address is added to the start address whereby the appropriate table can be accessed in response to the selection of one of the print modes. The width of the space or gap between characters can be selectively varied by changing the values in fields 40a, and 40c, and 50a, 50c. By rewriting the addresses of fields 40d and 50d, the dot pattern data jointly used by the proportional pitch and fixed pitch modes may be easily separated and defined independently for each mode, or the independent patterns may be converted into a single pattern usable by both modes thereby increasing the degree of freedom in the text editing process.

The dot patterns for the fixed pitch mode and the proportional pitch mode are stored at random in storage region 60 without identifiers or the like. Storage region 60 in a preferred embodiment is a ROM. Because the patterns are stored at random without the need for identifiers, the capacity of the ROM is efficiently utilized without waste and a smaller ROM, which is less expensive, may be utilized. Other storage devices such as PROM's, EPROM's or optical disks, for example may also be used.

Accordingly, a character pattern generator constructed in accordance with the present invention is presented. The character pattern generator stores the dot pattern data of the characters which require a different character pattern form for proportional printing in the same storage area as the fixed pitch character dot pattern data so that when proportional printing is selected by the attribute signal of a character code, the dot pattern data for the fixed pitch printing mode can be appropriately utilized thereby resulting in a reduction in the need for storage capacity of the storage region and a likewise reduction in cost. In addition, significant flexibility of printing is maintained by the ability to adjust the spacing between characters in the fixed pitch and proportional pitch tables. As used herein, characters refer to both characters and symbols.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A character pattern generator for a dot-matrix type printer having a print mode detector for detecting the fixed pitch or proportional pitch printing modes in accordance with an attribute code associated with a character code input from a host device, a momentary storage for storing the detection by the print mode detector, the character pattern generator outputting a character code signal corresponding to a fixed pitch or proportional pitch mode based on the result of the detection by the printing mode detector, comprising:

storage means for storing a plurality of first character characteristic dot pattern data for fixed pitch printing, and for storing a plurality of second character characteristic dot pattern data for proportional pitch printing only where the proportional pitch printing character characteristic dot pattern data corresponding to a character differs from the corresponding character's fixed pitch character characteristic dot pattern data and is not commonly used for printing the character in the fixed pitch and proportional pitch printing modes, said storage means being formed as a single ROM for storing the fixed pitch mode dot pattern data and the proportional pitch mode dot pattern data are intermixed;

first address location means for indicating the addresses of the fixed pitch character characteristic dot pattern data in the storage means in the fixed pitch mode;

second address location means for indicating the addresses of the character characteristic dot pattern data for proportional pitch printing in the storage means in the proportional pitch mode;

said character characteristic dot pattern data of said first address location means and of said second address location means indicating the address of a memory region wherein character patterns and symbol patterns for each respective mode are stored, information indicating the width of said pattern, and information indicating the size of blank portions adjacent said character and said symbol, said character characteristic dot pattern data being arranged so that when the character characteristic dot pattern of said proportional pitch mode and said fixed pitch mode are the same the address information has the same value; and selection means coupled to the storage means and the first and second address location means for receiving a character code signal representative of a charaacter and an attribute signal representative of one of fixed pitch and proportional pitch printing modes and for supplying the character code signal to the first address location means or the second address location means in accordance with the attribute signal.

2. The character pattern generator of claim 1 wherein the addresses indicated by the first and second address location means, corresponding to character code signals for which the fixed pitch printing and proportional pitch printing dot pattern data are identical, point to a single address in the storage means.

3. The character pattern generator of claim 1 wherein the number of characters for which there is second dot pattern data in the storage means is less than the number of characters for which there is first dot pattern data in the storage means.

4. The character pattern generator of claim 1 wherein the first and second address location means are each a table of data.

5. The character pattern generator of claim 4 wherein each table of data includes a record corresponding to each character code signal.

6. The character pattern generator of claim 5 wherein each record associated with a character code signal and corresponding to a character includes a starting address field representative of the starting address of the dot pattern data associated with the character code in the storage means and a character width field representative of the size of the dot pattern data in the storage means.

7. The character pattern generator of claim 6 wherein the first and second dot pattern data is found at the addresses of the storage means defined by the starting address and character width fields.

8. The character pattern generator of claim 6 wherein each record includes an attribute signal flag indicative of fixed pitch and proportional type spacing.

9. The character pattern generator of claim 6 wherein the starting address field is two bytes in length and the character width field is one byte in length.

10. The character pattern generator of claim 5 wherein each record associated with a character code signal and corresponding to a character includes a first field representative of the size of a blank portion on the left-hand side of the character, a second field representative of the width of the character dot pattern data, a third field representative of the size of a blank portion on the right-hand side of the character and a fourth field containing the starting address of the dot pattern data corresponding to the character in the storage means.

11. The character pattern generator of claim 10 wherein the first and second dot pattern data is found at the addresses of the storage means defined by the starting address and character width fields.

12. The character pattern generator of claim 10 wherein each record includes an attribute signal flag indicative of fixed pitch and proportional printing.

13. The character pattern generator of claim 10 wherein the fourth field is two bytes in length and the first, second and third fields are each one byte in length, so that each record is five bytes in length.

14. The character pattern generator of claim 10 wherein the leading bit of the address of the first and second address location means is a selector bit for selecting between the first and second address location means.

15. A character pattern generator for a dot-matrix type printer having a print mode detector for detecting the fixed pitch or proportional pitch printing modes in accordance with an attribute code associated with a character code input from a host device, a momentary storage for storing the detection by the print mode detector, the character pattern generator outputting a character code signal corresponding to a fixed pitch or proportional pitch mode based on the result of the detection by the printing mode detector, comprising:

storage means for storing a plurality of character's first character characteristic dot pattern data for a first mode of printing and for storing a plurality of characters second character characteristic dot pattern data for a second mode of printing only where the second mode of printing character characteristic dot pattern data corresponding to a character code differs from the corresponding character's first print mode character characteristic dot pattern data and is not commonly used for printing the character in the first and second modes, the storage means being formed as a single ROM in which the character characteristic dot pattern data for the first and second modes are mixed in the storage means;

first address location means for indicating the addresses of the first print mode character characteristic dot pattern data in the storage means in the first printing mode;

second address location means for indicating the addresses of the character characteristic dot pattern data for the second print mode in the storage means in the second printing mode;

said character characteristic dot pattern data of said first address location means and of said second address location means indicating the address of a memory region wherein character patterns and symbol pattern for each respective mode are stored, information indicating the width of said pattern, and information indicating the size of blank portion adjacent said character and said symbol, said character characteristic dot pattern data being arranged so that when the character characteristic dot pattern of said proportional pitch mode and said fixed pitch mode are the same the address information has the same value; and selection means coupled to the storage means and the first and second address location means for receiving a character code signal representative of a character and an attribute signal representative of one of the first and second printing modes and for supplying the character code signal to one of the first and second address location means in accordance with the attribute signal.

16. The character pattern generator of claim 15 wherein the number of characters for which there is second dot pattern data in the storage means is less than the number of characters for which there is first dot pattern data in the storage means.

17. The character pattern generator of claim 15 wherein the first and second address location means are each a table of data.

18. The character pattern generator of claim 17 wherein each table of data includes a record corresponding to each character code signal.

19. The character pattern generator of claim 18 wherein each record associated with a character code signal and corresponding to a character includes a starting address field representative of the starting address of the dot pattern data associated with the character code in the storage means and a character width field representative of the size of the dot pattern data in the storage means.

20. The character pattern generator of claim 18 wherein each record associated with a character code signal and corresponding to a character includes a first field representative of the size of a blank portion on the left-hand side of the character, a second field representative of the width of the character dot pattern data, a third field representative of the size of a blank portion on the right-hand side of the character and a fourth feild containing the starting address of the dot pattern data corresponding to the character in the storage means.

* * * * *